UNITED STATES PATENT OFFICE.

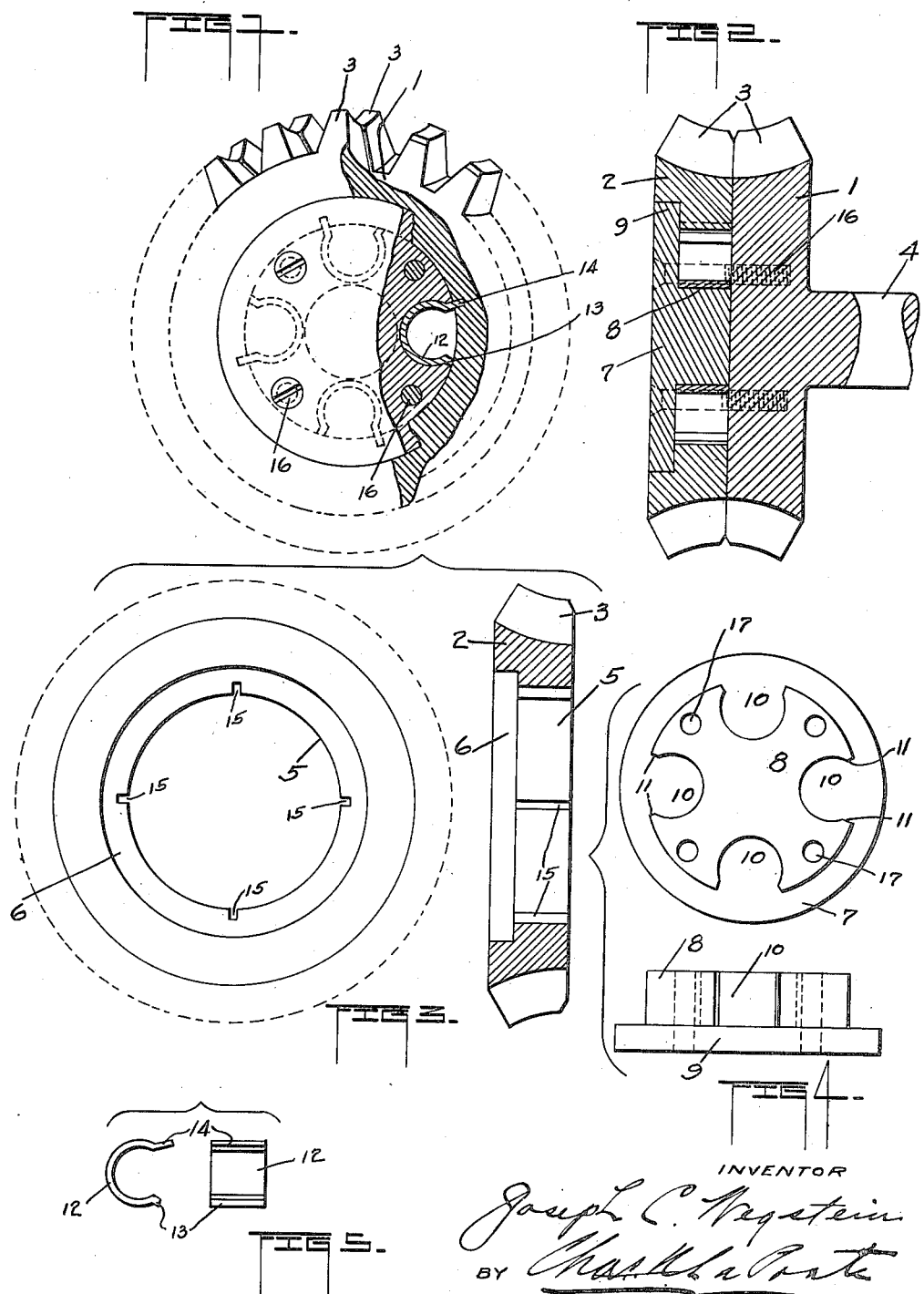

JOSEPH C. WEGSTEIN, OF WASHBURN, ILLINOIS.

GEAR WHEEL.

1,404,816.  Specification of Letters Patent.  Patented Jan. 31, 1922.

Application filed May 13, 1920. Serial No. 381,170.

*To all whom it may concern:*

Be it known that I, JOSEPH C. WEGSTEIN, a citizen of the United States, a resident of Washburn, in the State of Illinois, have invented new and useful Improvements in Gear Wheels, of which the following is a specification.

My invention has reference to gear-wheels, and it has for its principal object, to provide for the back-lash or clearance between such gear-wheel and the enmeshing gear-wheel.

My improved gear-wheel is applicable for use as a timing-gear, as well as a steering-gear, although other and various uses may be found for it.

The invention contemplates specifically a gear-wheel including preferably two body portions having circumferentially arranged teeth of any design; one of such bodies connected direct to a shaft, the other body having a resilient connection with a member secured to said first gear body, whereby said second gear body may have a slight rotational movement relative to said member so as to take up clearance, if any, between the enmeshing gear and said improved gear-wheel, before movement is imparted to said first gear body and shaft.

That the invention may be more fully understood, reference is had to the accompanying drawings forming a part of this description, and illustrating a preferred embodiment of the invention, in which:—

Figure 1 is a face view, partly in section, showing a gear-wheel embodying my invention;

Figure 2 is a radial cross-section through the gear-wheel;

Figure 3 shows a face view and a sectional view of the gear body designed to have a resilient connection with the gear body connected with a shaft;

Figure 4 shows a face view and an edge view of the member employed in connecting the complementary parts of the gear-wheel, and Figure 5 shows an edge view and a face view of one of a plurality of springs forming the connection between one of the gear bodies and the member connecting such gear body with the other gear body.

Like characters of reference denote corresponding parts throughout the figures.

I have elected to show the respective gear bodies of the gear-wheel with worm-teeth, presenting a worm-wheel adapted to have a meshing relation with an enmeshing driving worm. However, it is to be understood that the invention is not confined to such a gear-wheel and may be used with equal efficiency on other forms of gear-wheels.

The gear-wheel is illustrated as comprising the two gear bodies 1 and 2, each having circumferentially arranged teeth 3 of suitable design. The body 1 is shown preferably connected to a shaft 4, through which motion may be imparted to any movable or driven part. The body 2 has preferably a central annular cut-out portion 5, merging into the larger but narrower annular cut-out portion 6. In such cut-out portion 5 and 6 fits a member 7 formed with a body 8 arranged to fit the cut-out portion 5 and with a flange 9 arranged to fit the cut-out portion 6. The body 8 of said member 7 is provided with a plurality of semi-cylindrical recesses 10 opening out of the periphery of said body; the wall of each recess where they merge into the periphery of the body having the shoulders 11.

In each recess 10 of the member 7 is confined a preferably semi-cylindrical spring 12 with a short nib 13 lodged against one of the shoulders 11 of the recess, and with a longer nib 14 lodged against the other shoulder 11, and also entering a radially arranged recess 15, in the gear body 2, opening into the cut-out portion 5 of said gear body.

The springs 12 are first inserted into the recesses 10 in the member 7 when said member may be inserted into the annular cut-out portions of the gear body 2. This done, bolts 16 which are inserted through openings 17 in the member 7 are then screwed into the body of the gear body 1 uniting the member 7 and said gear body 1, the flange 9 on the member 7 preventing lateral separation of the two gear bodies 1 and 2.

When the gear bodies 1 and 2 are assembled to produce the completed gear wheel there is a slight separation of the teeth 3 on the respective bodies 1 and 2, in other words, they are not in alinement with each other. Assuming now that the teeth of an enmeshing gear are not true, when they enter between the two sets of gear teeth on the wheel shown, the teeth on the gear body 2 will be engaged first, imparting a slight rotational movement to the gear body 2 before motion is imparted to the gear body 1 and shaft 4. Such slight rotational movement of the gear body 2 will contract slightly the springs 12, made possible by the nibs 14 on said springs, thus permitting the alinement of the teeth of the bodies 1 and 2. This action will prevent back-lash as well as clearance in gearing, and also the reflex motion which occurs when power is suddenly applied.

What I claim is:

1. A gear-wheel including abutting split sections, a member carried internally of one section and providing means of connection between the two sections, said member having a plurality of approximately semi-cylindrical recesses, a spring member in each recess, each spring having a part in connection with the section containing said member, and arranged to permit said member to have limited rotational movement of the section on said member.

2. A gear-wheel including abutting split sections, one section having an annular opening and provided with a plurality of radially arranged recesses communicating with said opening, a member fitting the opening in said member and having a plurality of approximately semi-cylindrical recesses opening out of the peripheral surface of said member, and a spring fitting each recess in said member and having a part entering the radial recesses in said member and providing connecting means between said member and section, and permitting limited rotional movement of the section on said member.

In witness whereof, I have hereunto affixed my hand this 24 day of April, 1920.

JOSEPH C. WEGSTEIN.